Patented Dec. 26, 1939

2,184,770

UNITED STATES PATENT OFFICE 2,184,770

SULPHONIC DERIVATIVES

Morris B. Katzman, Chicago, Ill., assignor to The Emulsol Corporation, Chicago, Ill.

No Drawing. Application July 15, 1938,
Serial No. 219,358

25 Claims. (Cl. 260—401)

This invention relates to new chemical compounds in the form of sulphonic derivatives which are characterized by possessing interface modifying properties rendering the same highly useful for the purposes for which such agents are employed in the various arts. The invention also relates to novel intermediate compounds having utility for divers purposes.

At least most of the novel sulphonic compounds fall within the scope of the general formula $$RO-(alk-NY)_m-CO-Z[-SO_3M]_w$$

wherein R is an organic radical containing at least four carbon atoms, alk stands for hydrocarbon, for example, alkylene, or arylene such as ethylene or phenylene, Y is hydrogen, alkyl, cycloalkyl, alkoxyl, aralkyl, aryl, or alkylol, Z is preferably a hydrocarbon residue, containing preferably less than six carbon atoms, M is a cation, and $m$ and $w$ are whole numbers, preferably from one to four.

A more limited aspect of the compounds of the invention may be represented by the general formula

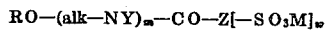

wherein R is a hydrocarbon radical or substituted hydrocarbon radical containing at least seven and preferably from eleven to seventeen carbon atoms, and M is a cation.

The radical R in the above formula may be of aliphatic, cycloaliphatic, aromatic or aromatic-aliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain upwards of ten carbon atoms to about eighteen carbon atoms. Z and alk, likewise, may contain substituent groups such as amino, hydroxy, halogen, sulphate, sulphonic, phosphate, carboxyl, nitrile, and the like, and the sequence of carbon atoms therein may be interrupted by O, S, C=O, NH, NR, where R is alkyl, and the like.

In order that the nature of the invention may become apparent, there are listed hereinbelow representative compounds which fall within the scope of the invention:

(1) $C_{11}H_{23}-C-O-CH_2-CH_2-NH-CO-CH_2-SO_3Na$
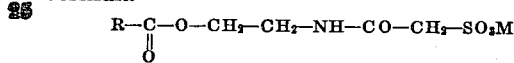

(2) $C_{17}H_{35}-C-O-CH_2-CH_2-NH-CO-CH_2-SO_3K$
  ‖
  O (3) $C_{13}H_{27}-C-O-CH_2-CH_2-NH-CO-CH_2-SO_3NH_4$
  ‖
  O (4) $C_{17}H_{33}-C-O-C_2H_4-NH-CO-CH_2-CH_2-SO_3Na$
  ‖
  O (5) $C_7H_{15}-C-O-CH_2-CH_2-NH-CO-CH_2-SO_3.N\begin{array}{c}C_2H_4OH\\-C_2H_4OH\\H\ \ C_2H_4OH\end{array}$
  ‖
  O (6) $C_{17}H_{35}-C-O-CH_2-CH-CH_2-NH-CO-CH_2-SO_3K$
  ‖         |
  O         OH (7) $C_{10}H_{21}-C-O-CH_2-CH_2-NH-CO-CH_2-SO_3.N\begin{array}{c}C_2H_4OH\\-H\\H\ H\end{array}$
  ‖
  O (8) $C_{12}H_{25}-O-CH_2-CH_2-NH-CO-CH_2-SO_3.N\begin{array}{c}\\H\end{array}\bigcirc$ (9) $C_{11}H_{23}-C-O-CH_2-CH_2-CH_2-NH-CO-CH_2-SO_3NH_4$
  ‖
  O

(10) $C_{19}H_{39}-C-O-CH_2-CH_2-NH-CO-CH_2-SO_3.N\begin{array}{c}C_2H_4OH\\-C_2H_4OH\\H\ C_2H_4OH\end{array}$
  ‖
  O

(11) $CH_3-(CH_2)_6-CH-C-O-CH_2-CH_2-NH-CO-CH_2-SO_3Na$
          |  ‖
          OH O

(12) ⬡⬡—C—O—CH₂—CH₂—NH—CO—CH₂—SO₃K
       ‖
       O

(13) ⬡—C—O—CH₂—CH₂—NH—CO—CH₂—SO₃K
     ‖
     O

(14) $\begin{array}{c}H_2C-CH_2\\H_2C\diagup\ \ \ \diagdown CH-C-O-CH_2\\H_2C-CH_2\ \ \ \ ‖\ \ \ \ |\\\ \ \ \ \ \ \ \ \ \ \ \ \ \ \ \ O\ \ \ \ CH_2\\\ \ \ \ \ \ \ \ \ \ \ \ \ \ \ \ \ \ \ \ \ \ |\\\ \ \ \ \ \ \ \ \ \ \ \ \ \ \ \ \ \ \ \ \ NH-CO-CH_2-SO_3Na\end{array}$

(15) $C_{11}H_{23}-C-O-CH_2-CH_2-NH-CO-CH_2-SO_3.N\begin{array}{c}C_2H_4OH\\-C_2H_4OH\\H\ C_2H_4OH\end{array}$
  ‖
  O

(16) $C_{13}H_{27}-C-O-CH_2-CH_2-NH-CO-CH_2-SO_3.N\begin{array}{c}C_2H_4OH\\-C_2H_4OH\\H\ H\end{array}$
  ‖
  O

(17) $C_{16}H_{33}-O-CH_2-CH_2-NH-CO-CH_2-SO_3K$

(18) $C_8H_{17}-O-CH_2-CH_2-NH-CO-CH_2-SO_3Na$

(19) $C_{11}H_{23}-C-O-CH_2-CH_2-CH_2-CH_2-NH-CO-CH_2-CH_2$
  ‖                                                        |
  O                                                      SO₃K

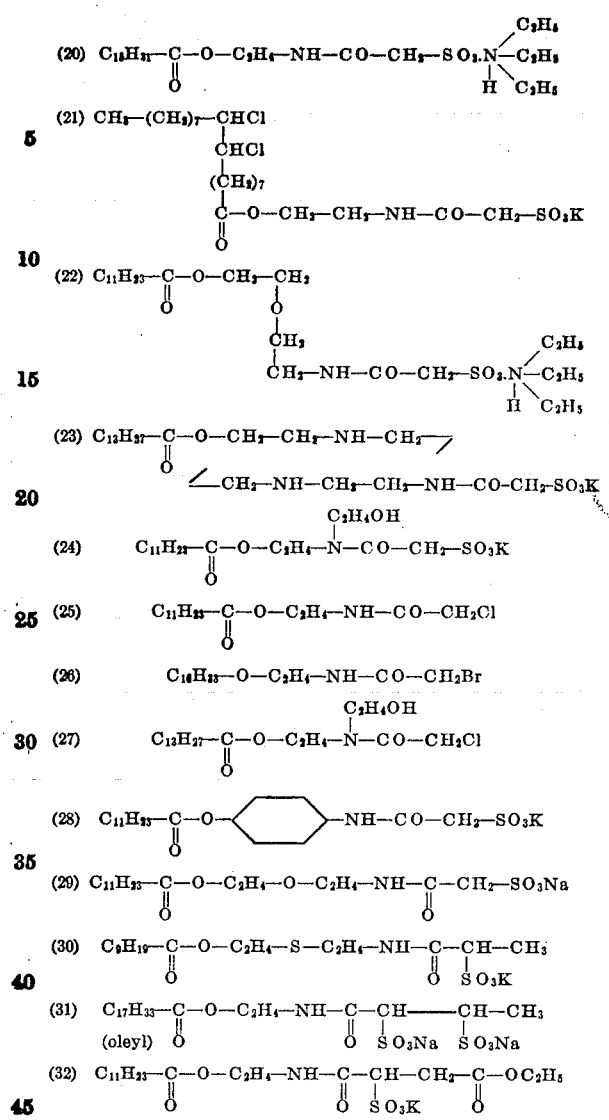

While the above examples represent single substances, it will be understood that in practice it is, in general, more advantageous to employ mixtures of any two or more thereof with or without diluents.

In general, the compounds are prepared by initially reacting a primary or secondary alcohol amine or alkylolamine, including corresponding polyamines, for example, monoethanolamine, with a halogen-carboxylic acid or derivative thereof under conditions such as to insure a substantial yield of amide. It has been found that if the halogen-carboxylic acid is employed in the form of an ester, for example, ethyl chloracetate, and low temperatures are employed, of the order of about 0 degrees C. to about 10 degrees C., excellent yields of amide are obtained. The resulting amide is then reacted with a higher molecular weight organic acid or halide thereof to produce the ester and with an alkali sulphite, for example, sodium, potassium, ammonium, or lithium sulphite, to introduce a sulphonic group into the molecule.

The following examples are illustrative of methods which have been found suitable for preparing various of the compounds which are disclosed herein. It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

(1) 122 grams of ethyl chloracetate were added slowly to a 25% aqueous solution containing 122 grams of monoethanolamine, the reaction being conducted at a temperature of 0 degrees C. to 10 degrees C. At the end of 15 minutes the reaction appeared to be complete. Approximately 126 grams of oxalic acid were then added to neutralize the excess of ethanolamine, maintaining preferably a temperature of 0 degrees C. to 10 degrees C. The water present in the reaction mixture was then evaporated off on the water bath and 1000 grams of iso-propyl alcohol were added. The mass was then filtered, the monoethanolamine oxalate being insoluble, and the alcohol was distilled off from the filtrate on a water bath under vacuum. (The excess monoethanolamine may be removed, if desired, in any other manner as, for example, by distillation under vacuum.) The resulting product, consisting essentially of the N-beta-hydroxyethyl, chloracetamide, was a semi-viscous liquid.

(2) 14.8 grams of the N-beta-hydroxethyl, chloracetamide, prepared as described in part (1) hereof, and 18.8 grams of lauroyl chloride were stirred vigorously while warming to 60 degrees C. over a period of 10 minutes. Approximately 5 minutes later, a vigorous reaction started with the evolution of hydrochloric acid. The resulting product, namely, the lauric acid ester of N-beta-hydroxyethyl, chloracetamide, was a solid, soft, waxy material.

(3) 15 grams of the ester produced in part (2) hereof were added to a solution of 8 grams of sodium sulphite in 50 cc. of water and the mass was stirred at a temperature of 95 degrees C. to 98 degrees C. for 45 to 50 minutes, the chlorine splitting off and being replaced by the group SO3Na. The resulting product, consisting essentially of a compound having the formula

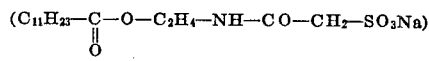

mixed with inorganic salts such as sodium chloride, can be used as such or, if desired, may be purified.

(4) In order to purify the product resulting from part (3) hereof, the reaction mass was extracted with 300 to 400 grams of iso-propyl alcohol, previously brought to a boil. The inorganic salts consisted principally of sodium chloride and sodium sulphite which were precipitated out and filtered off. Upon cooling the solution or filtrate, a substantially pure product, in anhydrous form, precipitated out and was filtered off. The product was a fine, white crystal line substance. It had good foaming, detergent and wetting properties, adapting it to be used for shampoos as well as for other purposes for which such agents are usually employed. The product was soluble in water and may be utilized in aqueous solutions of any desired strength.

*Example B*

(1) To 6.1 grams of monoethanolamine dissolved in 50 cc. of water and maintained in an ice bath there were added dropwise, with vigorous stirring, 21.6 grams of alpha-brom propionyl bromide. When approximately half of the latter had been added, the dropwise addition of 46.5 cc. of 2N NaOH was begun, the rest of the alpha-brom propionyl bromide being added dropwise meanwhile. The reaction was completed in 15 minutes and the mass was then evaporated on the water bath. It was then extracted with 500 cc. of boiling isopropyl alcohol and the mineral salts, such as sodium bromide, were filtered off. The alcohol was then evaporated and the reaction product, which was a viscous liquid, consisted essentially of a compound having the formula

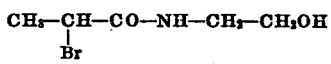

(2) 10 grams of the amide produced as described in part (1) hereof and 8 grams of lauroyl chloride were heated together at 50 degrees C. for approximately 5 minutes with vigorous stirring. When hydrochloric acid was no longer evolved, the reaction was terminated. The resulting compound was the lauric acid ester of the amide produced in part (1) hereof.

(3) To the reaction mass of part (2) hereof, 8 grams of sodium sulphite and 30 cc. of hot water were added and the entire mixture heated for between 2 and 3 hours at 90 to 95 degrees C. with vigorous stirring until all of the bromine was converted to sodium bromide. The resulting product consisted essentially of a compound having the formula

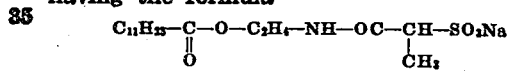

(4) If desired, the reaction mixture of part (3) hereof may be purified by adding thereto 6 volumes of isopropyl alcohol, heating to boiling, and filtering off the inorganic salts after which the alcohol solution may be cooled in an ice bath or the like to precipitate out the substantially pure sulphonic derivative whose formula is given hereinabove. The final product was a white, crystalline substance having substantially the same properties as those of Example A hereinabove.

*Example C*

(1) 14 grams of the N-beta-hydroxyethyl, chloracetamide, produced as described in part (1) of Example A hereinabove, and 14 grams of caprylyl chloride were heated to 50 degrees C. and stirred vigorously for several minutes. The reaction was considered complete when no more hydrochloric acid was evolved. The resulting reaction product contained a substantial proportion of the caprylic acid ester of N-beta-hydroxyethyl, chloracetamide.

(2) To the reaction product of part (1) hereof, 16 grams of sodium sulphite and 50 cc. of water were added and the entire mixture heated for 2 hours at 90 degrees C. to 95 degrees C. with stirring until a test portion became water soluble. The reaction mass contained substantial proportions of a compound having the formula

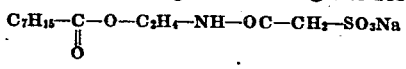

If desired, the reaction mixture may be purified in the same manner as described in the preceding examples. The reaction mixture as well as the final product after purification had properties similar to those of the previously described examples.

Instead of carrying out the reactions as described hereinabove, many of the compounds of this invention may be produced by reacting an amino alkyl ester with a sulphocarboxylic acid or ester or a sulphocarboxylic acyl halide in accordance, for example, with the following reaction:

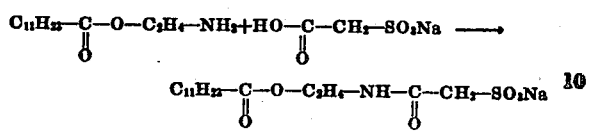

It will be understood, particularly in the light of the examples hereinabove, that the novel compounds of the present invention may contain one or more imino or like linkages. Thus, for example, in place of employing monoethanolamine or monopropanolamine or the like as a starting material, compounds may be utilized having a plurality of imino groups such as the following, by way of illustration:

(a) $HO-CH_2-CH_2-NH-CH_2-CH_2-NH-CH_2-CH_2-NH_2$ (b) $HO-CH_2-CH_2-CH_2-NH-CH_2-$
$\diagdown CH_2-CH_2-NH-CH_2-CH_2-CH_2-NH_2$ (c) $HO-\left(\begin{array}{c}CH_2-CH-CH_2-NH\\|\\OH\end{array}\right)-CH_2-CH-CH_2-NH_2$
$\phantom{HO-\left(\begin{array}{c}\end{array}\right)-CH_2-CH}|\phantom{CH_2-NH_2}$
$\phantom{HO-\left(\begin{array}{c}\end{array}\right)-CH_2-CH}OH$ As Examples 8, 17 and 18 show, the compounds may also comprise higher molecular weight ether derivatives. The higher molecular weight ethers may be prepared, for example, by reacting a compound containing a reactive halogen, for example, $ClC_2H_4-NH-CO-CH_2-SO_3K$ with an alkali metal alcoholate such as sodium laurylate $(C_{12}H_{25}-ON_a)$ in accordance with general methods known in the art. In general, the higher molecular weight esters are more satisfactory for most purposes.

The organic radical represented by R in the general formulae may, as stated, be derived from various sources. Among such sources may be mentioned straight chain and branched chain carboxylic, aliphatic, and fatty acids, saturated and unsaturated, such as butyric acid, caprylic acid, caproic acid, capric acid, sebacic acid, behenic acid, arachidic acid, cerotic acid erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as 1-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicyclic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

In those cases where ethers are prepared, the higher molecular weight organic radical is derived from alcoholates of alcohols corresponding to the higher molecular weight acids referred to hereinabove.

The halogen-corboxylic acids or other derivatives thereof, preferably in the form of their esters with ethyl alcohol or the like, which are reacted with the primary and secondary alcohol amines may be selected from a relatively large class including mono-, di- and poly-carboxylic derivatives as, for example, mono-chloracetic acid, mono-bromacetic acid, chloracetyl chloride, bromacetyl bromide, mono-iodoacetic acid, alpha-chlor propionic acid, alpha-chlor butyric acid, alpha-bromo capric acid, mono-chlor succinyl chloride, di-chlor succinyl chloride, mono-chlor succinic acid, di-chlor succinic acid, di-chlor glutaryl chloride, nitro-chloro-benzoyl chlorides and the like. Of particular utility are ethyl chloracetate and ethyl bromacetate.

The primary and secondary alcohol- or alkylolamines which are reacted with the chloracetyl chloride or the like to produce the halogen-containing derivatives include, among others, by way of example, monoethanolamine, diethanolamine, monopropanolamine, dipropanolamine, monobutanolamine,

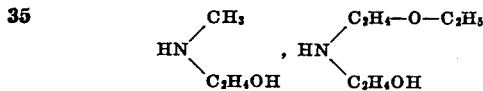

mono cyclo hexyl, beta-hydroxyethyl amine; monobutyl, beta-hydroxyethyl amine; ethanol aniline; 1-amino-propandiol-2, 3; sorbitol monoamine, and the like.

In the event that the sulphonic compounds of the present invention are made by reacting the halogen derivatives with an alkali sulphite or other soluble sulphites as well as thiosulphates, the corresponding alkali sulphonic acid derivative is produced. When prepared by other methods, other sulphonic acid salts may be produced or the alkali sulphonates can be converted into other salts by methods such as described in the application of Benjamin R. Harris, Serial No. 190,136, filed February 11, 1938, now Patent No. 2,166,144, issued July18, 1939. Thus, the cation represented by M in the general formulae set forth hereinabove may be calcium, magnesium, aluminum, zinc, organic nitrogenous bases as, for example, alcohol amines and alkylol-, arylol- and aralkylol amines including mono-, di- and triethanolamine and mixtures thereof such as are, for example, present in so-called commercial triethanolamine, propanolamines, butanolamines, pentanolamines, hexanolamines, glycerolamines, glucamines, dibutyl ethanolamine, diethanol ethyl amine, cyclohexyl ethanolamine, diethanol cyclohexylamine, ethanol aniline, alkylol polyamines such as alkylol derivatives of ethylene diamine, mono-methyl monoethanolamine, diethyl-mono-ethanolamine, 1-amino-2, 3 propanediol, 1,2-diaminopropanol; alkylamines such as butyl amine, hexylamine, dimethylamine, ethylene diamine, diethylene triamine, trie'hylene tetra-amine, mono-methyl ethylene diamine, mono-ethyl diethylene tetra-amine, mono-allyl amine, aromatic and heterocyclic bases such as benzylamine, cyclo - hexylethyl - aniline, morpholine, pyridine, alkyl pyridines such as methylpyridine, piperidine, pyrrolidines, quinolines, quinaldine, nicotine, and homologues and derivatives or substitution products thereof; mixtures of any two or more thereof, and the like. It will be understood that these organic bases, as in the case of triethanolamine, for example, may be employed in pure, impure, or commercial form.

Instead of reacting the halogeno-carboxylic acid amide of the primary or secondary alcohol amine, for example,

with an acyl halide, such as lauroyl chloride, and with an alkali sulphite as described hereinabove, the intermediate may be reacted with a salt of a higher molecular weight carboxylic acid or the like, such as sodium stearate, potassium laurate, sodium caprylate or the like, which will introduce an ester linkage into the molecule at the halogen end of the molecule. The resulting compound may then be reacted to introduce a hydrophillic group into the molecule such as a sulphate, phosphate, pyrophosphate, tetraphosphate, or other hydrophillic group. In other words, the configuration of the resulting compounds is such that the lipophillic and hydrophillic groups are at the opposite ends, respectively, of the location of such groups in the previously described compounds. An illustrative compound of the type under discussion may be represented by the following formula:

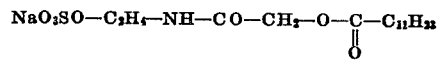

Those skilled in the art will know, in the light of my teachings herein, the manner of preparing compounds of this type.

The compounds of this invention have utility in various arts in which interface modifying agents are employed. They are resistance to precipitation by calcium and magnesium salts and are compatible with acid and alkali media. They may be utilized in washing and laundering and in the textile and related industries wherein they function for softening, wetting, detergent, emulsifying, penetrating, dispersing, frothing, and foaming purposes. The textiles, various treatments of which in the presence of the agents of the present invention is rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning, and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oil-field operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphates, including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monoethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey-red oils; compounds of the type of isopropyl naphthalene sodium sulphonate, and other classes of wetting agents.

It will be understood that, in all cases, there is present in the molecules of the sulphonic derivatives of the present invention at least one sulphonic acid radical although, depending upon the particular reacting ingredients and the proportions thereof utilized, more than one sulphonic group may be introduced.

Wherever the term "higher" is employed as referring to higher molecular weight organic acids or the like, it will be understood to cover compounds or radicals having at least six carbon atoms unless otherwise specifically stated.

Whenever the term sulphonic group, sulphonic radical, sulphonic acid group, or the like expression is employed in the claims, it will be understood to cover the compounds irrespective of whether the hydrogen of the sulphonic acid radical is present as such or replaced by another cation, unless the connotation otherwise expressly indicates differently.

What I claim as new and desire to protect by Letters Patent of the United States is:

1. Chemical compounds corresponding to the general formula $$RO-(alk-NY)_m-CO-Z(X)_w$$

wherein R is an organic radical containing at least four carbon atoms, alk and Z are each members selected from the class consisting of hydrocarbon radicals and substitution products thereof, Y is a member selected from the group consisting of hydrogen, alkyl, cycloalkyl, alkoxyl, aralkyl, aryl, and alkylol, $m$ and $w$ are whole numbers, and X is a sulphonic radical.

2. Chemical compounds corresponding to the general formula

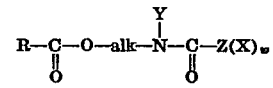

wherein R—C=O is an aliphatic acyl radical containing at least eight carbon atoms, alk is a hydrocarbon radical, Y is a member selected from the group consisting of hydrogen, alkyl, cycloalkyl, alkoxyl, aralkyl, aryl, and alkylol, Z is a hydrocarbon residue, X is a sulphonic radical and $w$ is a whole number.

3. Chemical compounds corresponding to the general formula

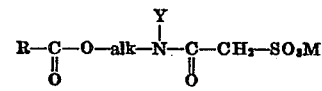

wherein R—C=O is an aliphatic acyl radical containing at least eight carbon atoms, alk is alkylene, Y is a member selected from the group consisting of hydrogen, alkyl, cycloalkyl, alkoxyl, aralkyl, aryl, and alkylol, and M is a cation.

4. Chemical compounds corresponding to the general formula $$RO-(alk-NY)_m-CO-ZX$$

wherein R is an organic radical containing at least four carbon atoms, alk is hydrocarbon, Y is a member selected from the group consisting of hydrogen, alkyl, cycloalkyl, alkoxyl, aralkyl, aryl, and alkylol, $m$ is a whole number, Z is a hydrocarbon residue, and X is a sulphonic radical.

5. Chemical compounds corresponding to the general formula

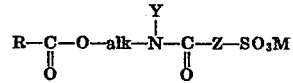

wherein R—C=O is an aliphatic acyl radical containing at least eight carbon atoms, alk is hydrocarbon, Y is a member selected from the group consisting of hydrogen, alkyl, cycloalkyl, alkoxyl, aralkyl, aryl, and alkylol, Z is a hydrocarbon residue, and M is a cation.

6. Chemical compounds corresponding to the general formula

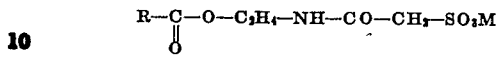

wherein R—C=O is an acyl radical containing at least four carbon atoms, and M is a cation.

7. Chemical compounds corresponding to the general formula

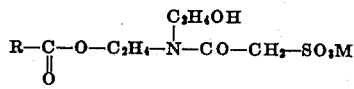

wherein R—C=O is an acyl radical containing at least four carbon atoms, and M is a cation.

8. Chemical compounds corresponding to the general formula

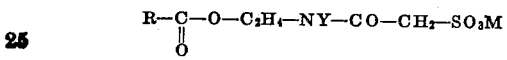

wherein R—C=O is a fatty acid acyl radical containing from eight to eighteen carbon atoms, Y is a member selected from the group consisting of hydrogen, alkyl, cycloalkyl, alkoxyl, aralkyl, aryl, and alkylol, and M is a cation.

9. Chemical compounds corresponding to the general formula

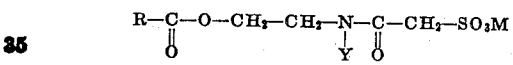

wherein R—C=O is an aliphatic acyl radical containing at least eight carbon atoms, Y is a member selected from the group consisting of hydrogen, alkyl, cycloalkyl, alkoxyl, aralkyl, aryl, and alkylol, and M is an alkali metal.

10. Chemical compounds corresponding to the formula

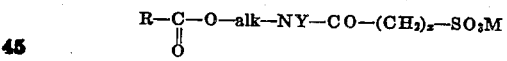

wherein R—C=O is an aliphatic acyl radical containing at least eight carbon atoms, alk is a member selected from the class consisting of alkylene and substitution products thereof, Y is a member selected from the group consisting of hydrogen, alkyl, cycloalkyl, alkoxyl, aralkyl, aryl, and alkylol, M is a cation, and $x$ is a number ranging from one to four.

11. Chemical compounds corresponding to the formula

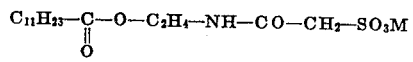

wherein M is a cation.

12. The process of preparing chemical compounds which comprises reacting a halogeno-carboxylic acid amide of an alcohol amine with a member selected from the group consisting of carboxylic acids and halides thereof containing at least four carbon atoms to form an ester linkage and with an alkali sulphite to replace halogen with a sulphonic group.

13. The process of preparing chemical compounds which comprises reacting N-beta-hydroxyethyl, chloracetamide with an acyl halide containing from eight to eighteen carbon atoms to form an ester linkage and with an alkali sulphite to replace chlorine with a sulphonic group.

14. The process of preparing chemical compounds which comprises reacting the ethyl ester of chloracetic acid with monoethanolamine at temperatures of about 0 degrees C. to 10 degrees C. to produce essentially N-beta-hydroxyethyl, chloracetamide, then reacting said amide with lauroyl chloride to produce the lauric acid ester of said amide, and then reacting said compound with an alkali metal sulphite whereby the chlorine group of the lauric acid ester of the N-beta-hydroxyethyl, chloracetamide is replaced by a sulphonic group.

15. The method of preparing chemical compounds which comprises reacting an ethyl alcohol ester of a member selected from the group consisting of chloracetic acid, bromacetic acid, and iodo acetic acid, with a member selected from the group consisting of primary and secondary alkylolamines, to form an amide, and then introducing, at opposite ends of the amide, a fatty acid radical containing at least four carbon atoms and a sulphonic group.

16. The method of claim 15 wherein the alkylolamine comprises a member of the group consisting of monoethanolamine, diethanolamine, and mixtures thereof.

17. The method of preparing chemical compounds which comprises reacting an ester of a halogeno-carboxylic acid with a member selected from the group consisting of primary and secondary alcohol amines to form an amide, and then introducing into the amide a sulphonic group and an organic radical containing at least four carbon atoms.

18. The method of preparing chemical compounds which comprises reacting an ethyl alcohol ester of a member selected from the group consisting of chloracetic acid, bromacetic acid and iodo acetic acid, with a member selected from the group consisting of primary and secondary alkylolamines to form an amide, said reaction being carried out at a temperature of the order of 0 degrees C. to 10 degrees C., and then introducing into said amide a sulphonic group and a fatty acid radical containing from eight to eighteen carbon atoms.

19. The method of claim 18 wherein the alkylolamine comprises a member of the group consisting of monoethanolamine, diethanolamine and mixtures thereof.

20. The method of claim 18 wherein the sulphonic group is introduced into the molecule subsequent to the introduction into the molecule of said fatty acid radical.

21. The process of preparing chemical compounds which comprises reacting an amino alkyl ester of an aliphatic acid containing at least four carbon atoms with a member selected from the group consisting of lower molecular weight sulphocarboxylic acids, their esters, and their acyl halides.

22. The process of preparing chemical compounds which comprises reacting an amino alkyl ester of a fatty acid having from eight to eighteen carbon atoms with a member selected from the group consisting of aliphatic sulpho-carboxylic acids containing not more than six carbon atoms, their esters, and their acyl halides.

23. Chemical compounds corresponding to the formula

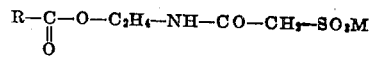

wherein

is a fatty acid acyl radical containing from eight to eighteen carbon atoms, and M is an alkylolamine cation.

24. Chemical compounds corresponding to the formula

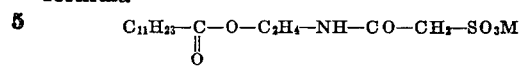

where M is an ethanolamine cation.

25. The method of preparing chemical compounds which comprises reacting a volatile alcohol ester of a member selected from the group consisting of chloracetic acid, bromacetic acid and iodo acetic acid, with monoethanolamine at a temperature not above about 10 degrees C. to form an amide of the monoethanolamine, precipitating the excess monoethanolamine with oxalic acid, filtering to remove the precipitate of monoethanolamine oxalate, distilling the filtrate to remove alcohol formed in the amidification reaction, reacting the residue with an acyl halide of a fatty acid containing from eight to eighteen carbon atoms to form an ester, reacting the resulting ester with an aqueous solution containing an alkali sulphite, and purifying the final compound to remove unreacted fatty material therefrom.

MORRIS B. KATZMAN.